US012143664B2

(12) United States Patent
Perumalla et al.

(10) Patent No.: US 12,143,664 B2
(45) Date of Patent: Nov. 12, 2024

(54) DYNAMICALLY CREATING AND PLAYING A SCENARIO REPLICATION FOR AN ACTIVITY ON VISUAL AND AUDIO DEVICES

(71) Applicant: INTERNATIONAL BUSINESS MACHINES CORPORATION, Armonk, NY (US)

(72) Inventors: Saraswathi Sailaja Perumalla, Visakhapatnam (IN); Shanthan Chamala, Malvern, PA (US); Venkata Vara Prasad Karri, Visakhapatnam (IN); Gautam Zalpuri, Boxborough, MA (US); Maithree Challapalli, Visakhapatnam (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 243 days.

(21) Appl. No.: 17/454,507

(22) Filed: Nov. 11, 2021

(65) Prior Publication Data

US 2023/0144461 A1 May 11, 2023

(51) Int. Cl.
*H04N 21/432* (2011.01)
*G06N 3/04* (2023.01)
(Continued)

(52) U.S. Cl.
CPC ......... *H04N 21/4325* (2013.01); *G06N 3/04* (2013.01); *G06N 5/02* (2013.01); *G06N 5/04* (2013.01); *H04N 21/44226* (2020.08)

(58) Field of Classification Search
CPC ......... H04N 21/4325; H04N 21/44226; G06C 3/04; G06C 5/02; G06C 5/04
See application file for complete search history.

(56) References Cited

U.S. PATENT DOCUMENTS 10,599,816 B2 * 3/2020 Orenstein ............... G01W 1/10
11,185,241 B2 * 11/2021 Ahmed ................. A61B 5/6824
(Continued)

OTHER PUBLICATIONS

Mell, P. et al., "The NIST Definition of Cloud Computing (Draft)", Sep. 2011, Computer Security Division Information Technology Laboratory National Institute of Standards and Technology, Total 7 pp.
(Continued)

*Primary Examiner* — Mishawn N. Hunter
(74) *Attorney, Agent, or Firm* — KONRAD, RAYNES, DAVDA & VICTOR LLP; Janaki K. Davda

(57) ABSTRACT

Provided are techniques for dynamically creating and playing a scenario replication for an activity on one or more visual and audio devices. One or more patterns and one or more contexts are stored. One or more goals are stored for a user. A current context is identified from data from a plurality of data sources. The current context is matched to a stored context of the one or more contexts. A pattern associated with the matched context is identified. A recommendation of an activity is provided based on the pattern and based on a goal of the one or more goals. A scenario replication is created with at least one of visual elements and audio elements for the recommendation. One or more visual and audio devices are identified. The scenario replication is played on the one or more visual and audio devices.

20 Claims, 12 Drawing Sheets

(51) Int. Cl.
    *G06N 5/02*         (2023.01)
    *G06N 5/04*         (2023.01)
    *H04N 21/442*    (2011.01)

(56) References Cited

U.S. PATENT DOCUMENTS

| | | | |
|---|---|---|---|
| 2011/0184948 A1* | 7/2011 | Tseng | G06F 16/686 |
| | | | 707/E17.089 |
| 2017/0039480 A1* | 2/2017 | Bitran | A61B 5/01 |
| 2017/0116552 A1* | 4/2017 | Deodhar | G06Q 10/0639 |
| 2017/0132395 A1* | 5/2017 | Futch | G06Q 40/08 |
| 2017/0359236 A1 | 12/2017 | Circlaeys et al. | |
| 2018/0036591 A1* | 2/2018 | King | H04N 5/76 |
| 2018/0054376 A1 | 2/2018 | Hershey et al. | |
| 2018/0247241 A1* | 8/2018 | Avrahami | G06Q 10/06316 |
| 2019/0187689 A1 | 6/2019 | Cella et al. | |
| 2020/0151619 A1 | 5/2020 | Mopur et al. | |
| 2021/0321942 A1* | 10/2021 | Pushpala | A61B 5/0205 |
| 2022/0208353 A1* | 6/2022 | Neumann | G06N 20/00 |
| 2022/0240843 A1* | 8/2022 | Kokoszka | G16H 50/70 |

OTHER PUBLICATIONS

Mell, P. et al., "Effectively and Securely Using the Cloud Computing Paradigm", [online], Oct. 7, 2009, retrieved from the Internet at URL: http://csrc.nist.gov/groups/SNS/cloud-computing/cloud-computing-v26.ppt , Total 80 pp.

* cited by examiner

DYNAMICALLY CREATING AND PLAYING A SCENARIO REPLICATION FOR AN ACTIVITY ON VISUAL AND AUDIO DEVICES

BACKGROUND

Embodiments of the invention relate to dynamically creating and playing a scenario replication for an activity on visual and audio devices.

Different individuals may enjoy different types of entertainment (e.g., watching television, playing a game, going for a walk, etc.) while using a mobile device (e.g., a wearable device, such as a smart watch). Also, some individuals may be conscious about fitness and may use a tracking application (such as a fitness tracker, an entertainment platform, etc.) on a mobile device to track exercise.

The mobile devices generate metrics at a very granular level and generate insights from the metrics. For example, if there is a change noticed from a general average number of steps walked, the mobile device may notify the user of this.

SUMMARY

In accordance with certain embodiments, a computer-implemented method is provided for dynamically creating and playing a scenario replication for an activity on visual and audio devices. The computer-implemented method comprises operations. One or more patterns and one or more contexts are stored, where each of the one or more patterns is associated with a context of the one or more contexts. One or more goals are stored for a user. A current context is identified from data from a plurality of data sources. The current context is matched to a stored context of the one or more contexts. The pattern associated with the matched context is identified. A recommendation of an activity is provided based on the pattern and based on a goal of the one or more goals. A scenario replication is created with at least one of visual elements and audio elements for the recommendation. One or more visual and audio devices are identified. The scenario replication is played on the one or more visual and audio devices.

In accordance with other embodiments, a computer program product is provided for dynamically creating and playing a scenario replication for an activity on visual and audio devices. The computer program product comprises a computer readable storage medium having program code embodied therewith, the program code executable by at least one processor to perform operations. One or more patterns and one or more contexts are stored, where each of the one or more patterns is associated with a context of the one or more contexts. One or more goals are stored for a user. A current context is identified from data from a plurality of data sources. The current context is matched to a stored context of the one or more contexts. The pattern associated with the matched context is identified. A recommendation of an activity is provided based on the pattern and based on a goal of the one or more goals. A scenario replication is created with at least one of visual elements and audio elements for the recommendation. One or more visual and audio devices are identified. The scenario replication is played on the one or more visual and audio devices.

In accordance with yet other embodiments, a computer system is provided for dynamically creating and playing a scenario replication for an activity on visual and audio devices. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. One or more patterns and one or more contexts are stored, where each of the one or more patterns is associated with a context of the one or more contexts. One or more goals are stored for a user. A current context is identified from data from a plurality of data sources. The current context is matched to a stored context of the one or more contexts. The pattern associated with the matched context is identified. A recommendation of an activity is provided based on the pattern and based on a goal of the one or more goals. A scenario replication is created with at least one of visual elements and audio elements for the recommendation. One or more visual and audio devices are identified. The scenario replication is played on the one or more visual and audio devices.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments provide an Artificial Intelligence (AI) and Internet of Things (IoT) enabled activity engine that uses historical, contextual data about activities of a user to recreate a scenario replication for the activity. In certain embodiments, the scenario replication includes any combination of visual and audio elements. For example, the scenario replication may include visual elements (e.g., a video played on a mobile device screen or on a smart television, a picture or document displayed using a projector, etc.) and/or audio elements (e.g., music or conversation played on the mobile device or on a smart speaker, etc.). For example, a scenario replication that includes a movie has both visual and audio elements, while a scenario replication that includes music has audio elements, and a scenario replication that includes a series of digital photos (a memory album) includes visual elements. The scenario replication may act as a cue for the user start the activity.

Embodiments also validate the historical, contextual data and identify any deviations (i.e., changes or deltas) from patterns for the activities. The patterns are used to recreate the scenario replication for the activity by playing the visual and/or audio elements. In certain embodiments, the scenario replication may be described as the visual and audio elements representing one or more historical moments.

Figure 1:
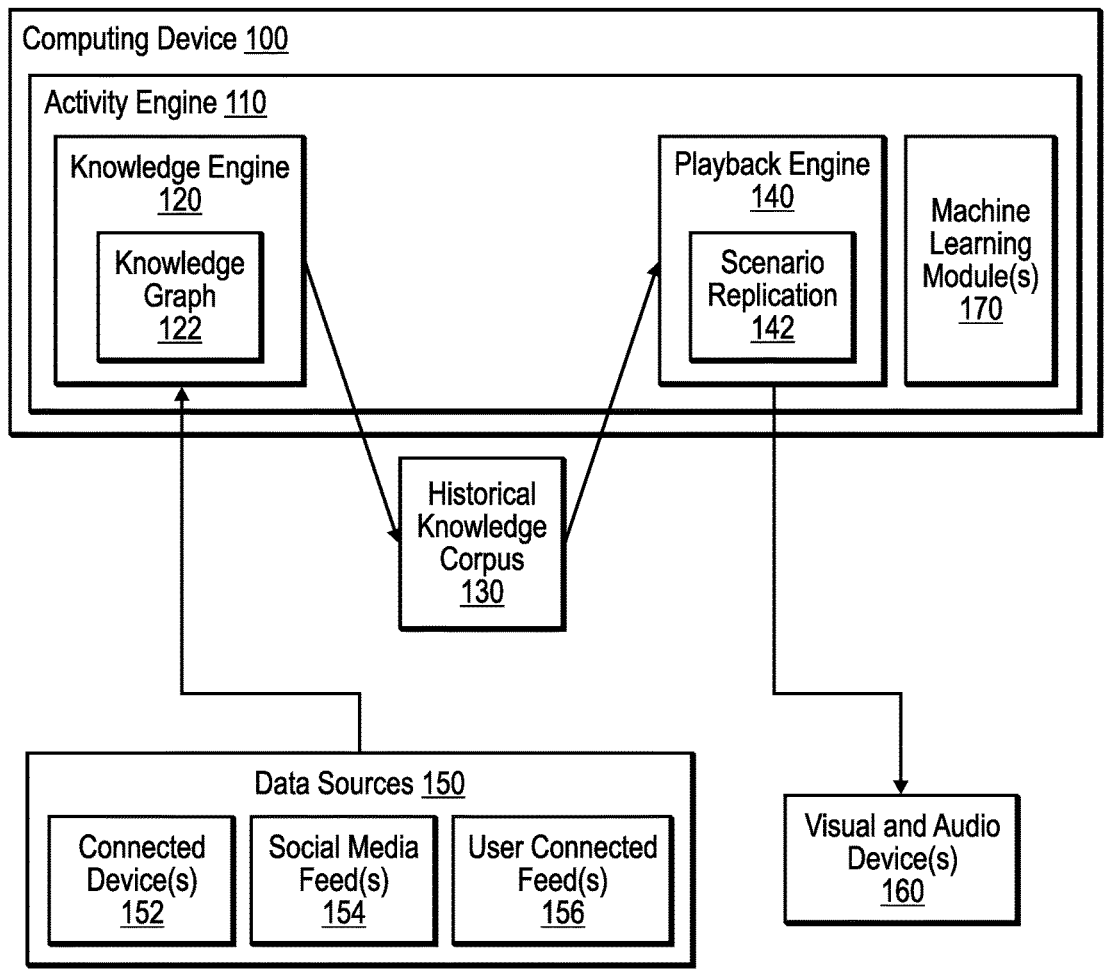
FIG. 1 illustrates, in a block diagram, a computing environment in accordance with certain embodiments.

FIG. 1 illustrates, in a block diagram, a computing environment in accordance with certain embodiments. In FIG. 1, a computing device 100 includes an activity engine 110. The activity engine 110 includes a knowledge engine 120 and a playback engine 140. In certain embodiments, the knowledge engine 120 and the playback engine 140 are separate engines and may execute on different computing devices (e.g., on different nodes of a cloud infrastructure). The knowledge engine 120 receives data from data sources 150 and stores the data in a historical knowledge corpus 130. The data sources include one or more connected devices 152, one or more social media feeds 152, and one or more user connected feeds 156. The playback engine 140 retrieves the data from the historical knowledge corpus 130, identifies patterns in the data, identifies deviations from the patterns, creates a scenario replication 142 for playback, and outputs the scenario replication 142 to one or more visual and audio devices 160 for playing. In certain embodiments, multiple visual and audio devices 160 are used to play the scenario replication (e.g., by playing audio elements of a movie through speakers, while playing visual elements of the movie on a television).

Figure 2:
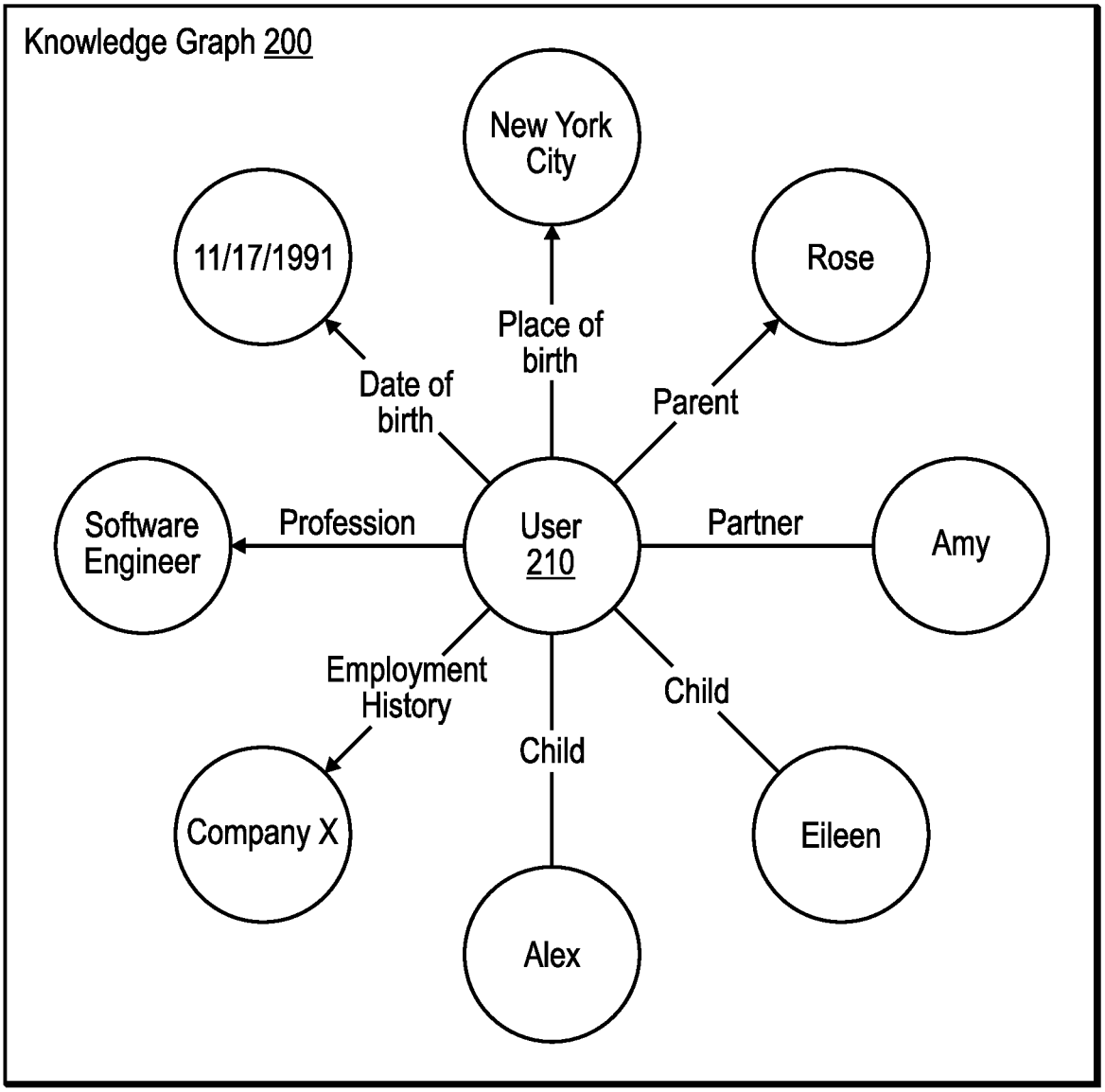
FIG. 2 illustrates an example knowledge graph in accordance with certain embodiments.

In certain embodiments, the knowledge engine 120 uses the data from the data sources 150 to generate a knowledge graph 122. In certain embodiments, events and situations are nodes, while the connectors between the nodes identify a relationship. FIG. 2 illustrates an example knowledge graph 200 in accordance with certain embodiments. In FIG. 2, a knowledge graph 200 for a user 210 has been generated by the knowledge engine 120.

In certain embodiments, the activity engine 110 includes one or more machine learning modules 170, and the activity engine 110 uses the machine learning modules 170 to generate the scenario replication 142.

Figure 3:
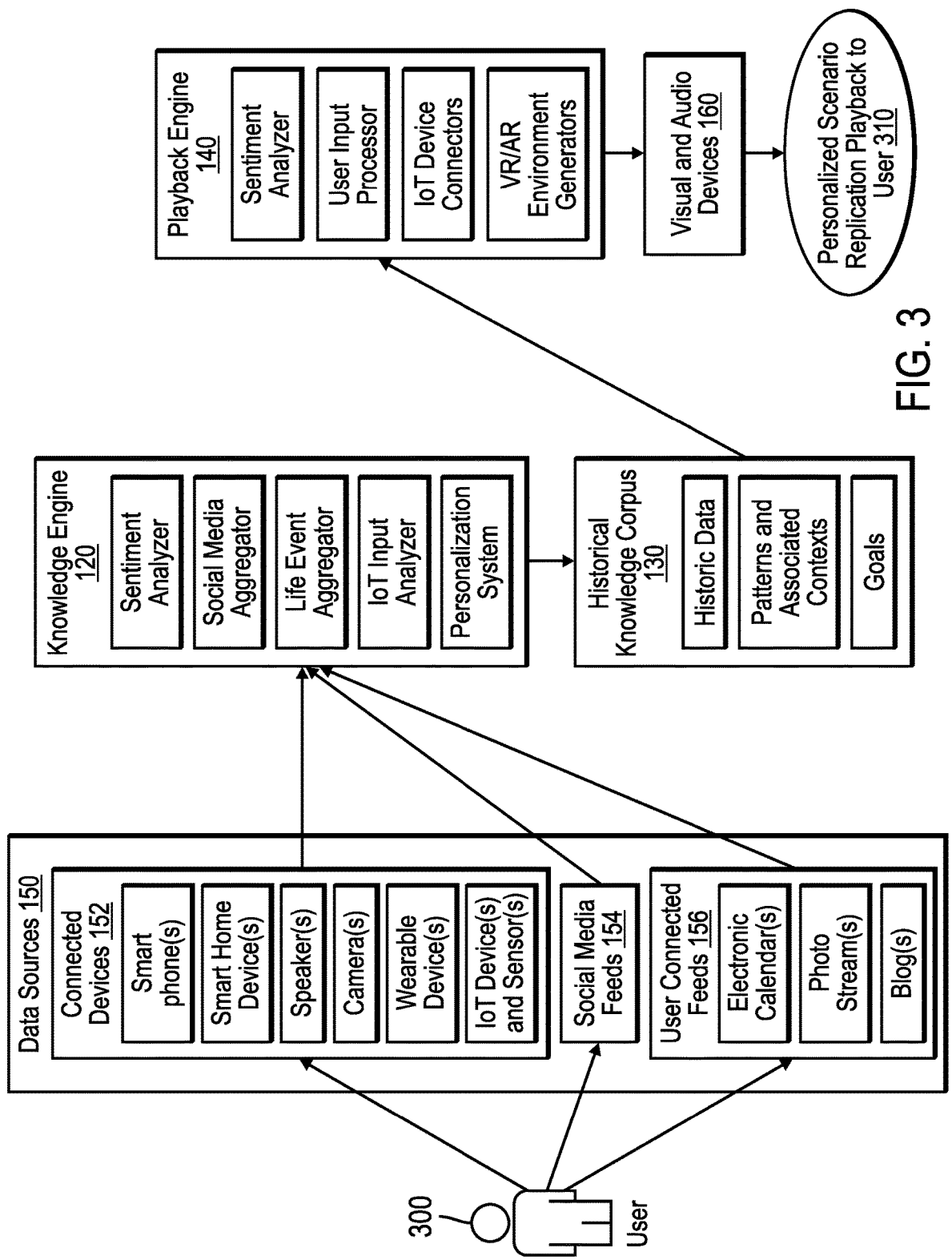
FIG. 3 illustrates, in a block diagram, further details of the computing environment of FIG. 1 in accordance with certain embodiments.

FIG. 3 illustrates, in a block diagram, further details of the computing environment of FIG. 1 in accordance with certain embodiments. The data sources 150 collect data about a user 300. The connected devices 152 of the data sources 150 may include one or more smart phones, one or more smart home devices (e.g., smart home automation devices or systems), one or more speakers, one or more cameras, one or more wearable devices, one or more IoT devices and sensors, etc., The social media feeds 152 of the data sources 150 may include data from different social media feeds, where the different social media feeds may be associated with different social media applications. The user connected feeds 156 of the data sources 150 may include one or more calendars, one or more photo streams, one or more blogs, etc. The knowledge engine 120 includes a sentiment analyzer for analyzing the sentiment (e.g., happy, positive, angry, sad, etc.) of the data from the data sources 150, a social media aggregator (i.e., to group data from on-line networking applications (such as a chatting application, a posting application, etc.)), a life event aggregator (i.e., to group important events in a month (such as birthdays, vacations, parties, outings, etc.)), an IoT input analyzer to analyze the data from the IoT devise and sensors, and a personalization system (i.e., to accept user input to personalize a knowledge graph). The knowledge engine 120 stores the analyzed data in the historical knowledge corpus 130 as historical data, and the playback engine 140 performs processing on this stored data. The playback engine 140 includes a sentiment analyzer (to perform additional sentiment analysis), a user input processor, IoT device connectors (e.g., for home automation devices (such as an oven that may report how much time is spent using the oven, which indicates time spent cooking or baking)), and Virtual Reality (VR)/Augmented Reality (AR) environment generators. The playback engine 140 generates and sends the visual playback and the audio playback to the visual and audio devices 160 to provide a personalized scenario replication 310 for the user 300.

In certain embodiments, the historical knowledge corpus 130 stores patterns and associated contexts. In certain embodiments, the context indicates a setting for the associated pattern (e.g., a pattern of a driving route has a context of going to work) and/or indicates a topic (e.g., the context for a pattern of having a particular food once a week is "weekly dinner"). In certain embodiments, the historical knowledge corpus 130 also stores goals that the user has provided (e.g., fitness goals, work goals (e.g., getting a promotion, speaking at an event, etc.), goals (e.g., learning a new language, spending more time with family, etc.), academic goals, etc.). Then, the activity engine 110 provides recommendations to reach those goals.

Figure 4:
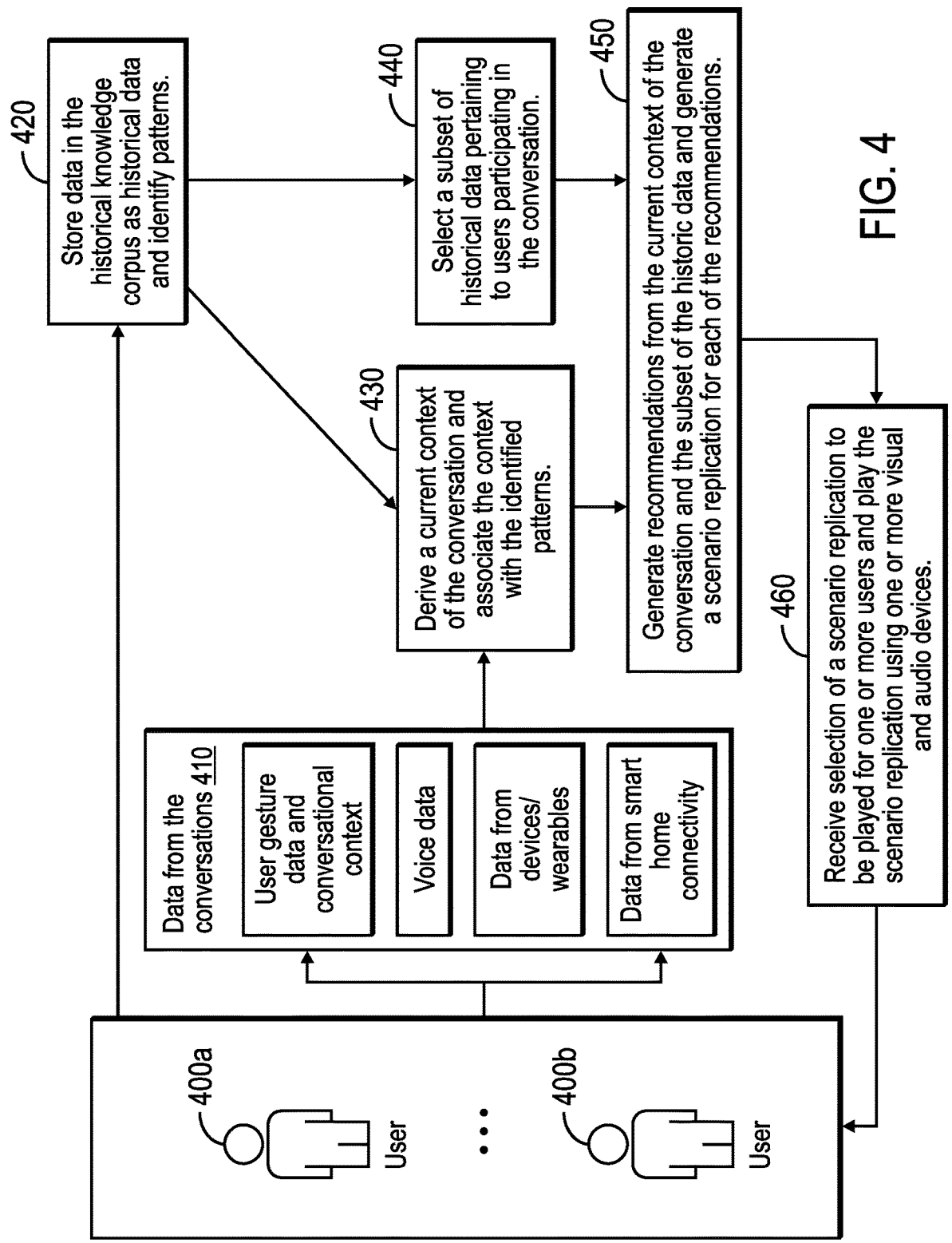
FIG. 4 illustrates a flow of data and processing in accordance with certain embodiments.

FIG. 4 illustrates a flow of data and processing in accordance with certain embodiments. First, users 400a . . . 400n are involved in conversations, and the activity engine 110 stores the data from the conversations 410. The data from the conversations 410 includes user gesture data (e.g., how the hands or head moved) and conversational context (e.g., the conversation is about a vacation, what to have for dinner, etc.), voice data (which may be stored and associated with each user for matching other voice data back to the same user), data from devices (e.g., IoT devices) and wearables (e.g., a smart watch, a smart contact lens, a smart shirt, smart shoes, etc.), and data from smart home connectivity (e.g., how long is the television on, how much time is spent cooking, etc.).

The activity engine 110 stores the data from the conversations in a historical knowledge corpus as historical data and identifies patterns (i.e., content matching) (block 420). For example, there may be patterns detected of cooking from 5:00 pm-6:00 pm and television watching from 7:00 pm to 9:00 pm.

The activity engine 110 uses the data from the conversations 410 to derive context (e.g., emotional context, such as that a conversation took place (context) during which a particular emotion was identified of the conversations) and associates the context with the identified patterns (block 430). For example, the context for a pattern may be from the context of a user speaking with someone over the phone or a user meeting someone at a market.

The activity engine 110 selects a subset of the historical data that pertains to users involved in the current conversation (block 440).

The activity engine 110 generates recommendations from the context of the conversation and the subset of the historical data and generates a scenario replication for each of the recommendations (block 450). With embodiments, a recommendation identifies an activity. For example, one recommendation may be to use the treadmills in the gym (the activity), and, for the scenario replication, the activity engine 110 may turn on the television to a show that is typically watched when the treadmills are in use. Then, the activity engine 110 receives selection of a scenario replication to be played for one or more users, and the activity engine 110 plays the scenario replication using one or more visual and audio devices 160 (block 460). The scenario replication may be played to support or encourage the activity.

Figure 5:
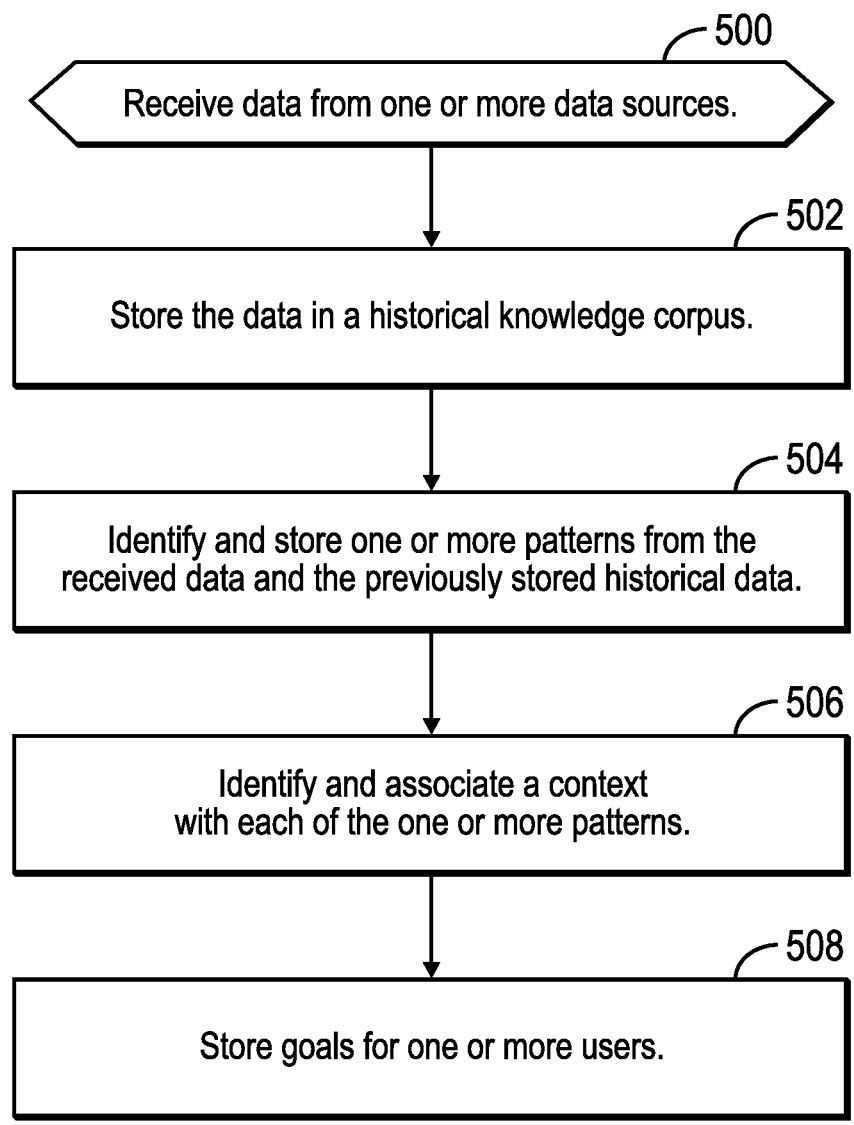
FIG. 5 illustrates, in a flowchart, operations for generating contexts and patterns in accordance with certain embodiments.

FIG. 5 illustrates, in a flowchart, operations for generating contexts and patterns in accordance with certain embodiments. Control begins at block 500 with the activity engine 110 receiving data from one or more data sources. In block 502, the activity engine 110 stores the data in a historical knowledge corpus. In block 504, the activity engine 110 identifies and stores one or more patterns from the received data and the previously stored historical data. In block 506, the activity engine 110 identifies and associates a context with each of the one or more patterns. The context stored with a pattern in the historical knowledge corpus may be referred to as a historical context. In block 508, the activity engine 110 may also store goals for one or more users. In certain embodiments, the one or more users provide the goals to the activity engine via a user interface.

Figure 6A:
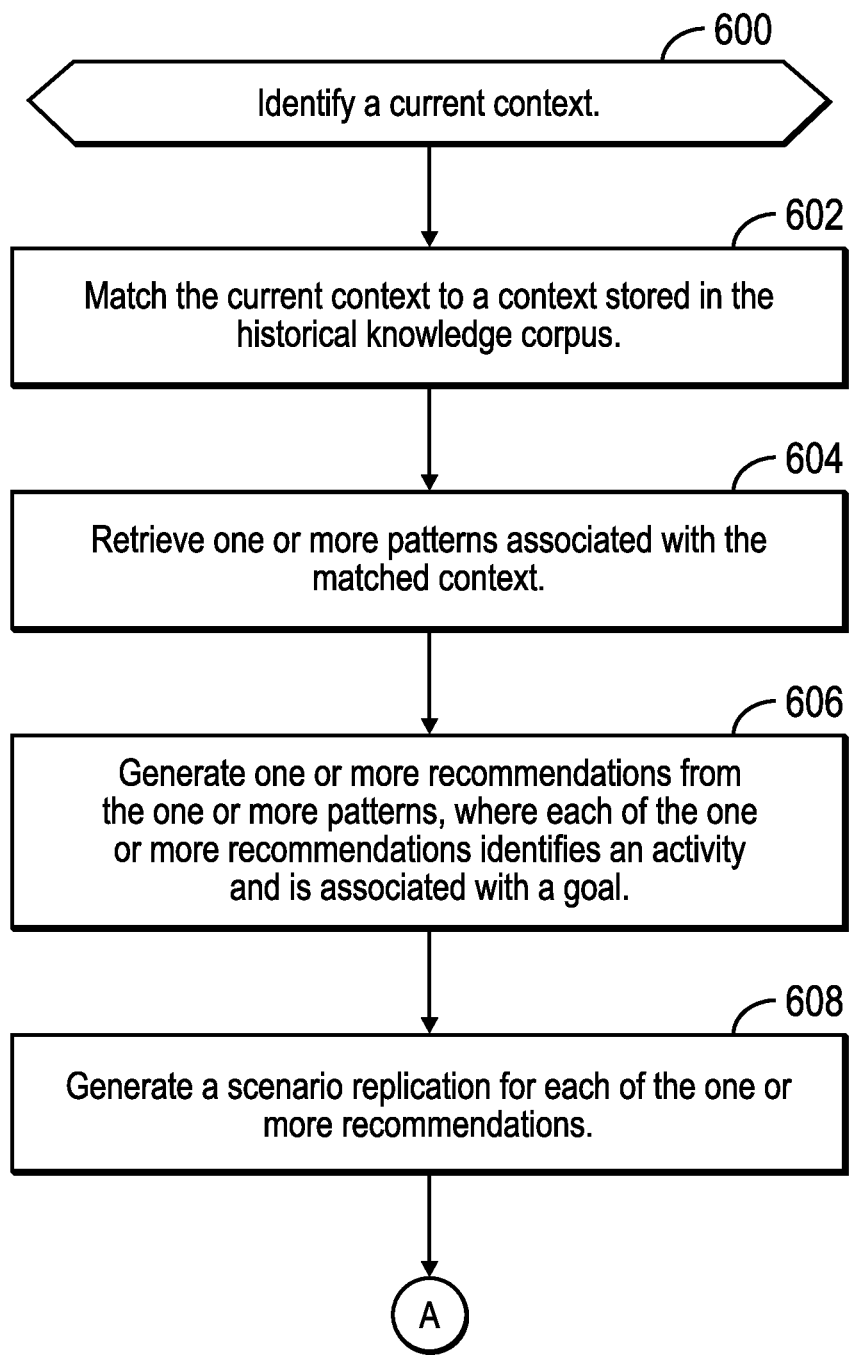
FIGS. 6A and 6B illustrate, in a flowchart, operations for creating and playing a scenario replication in accordance with certain embodiments.
Figure 6B:
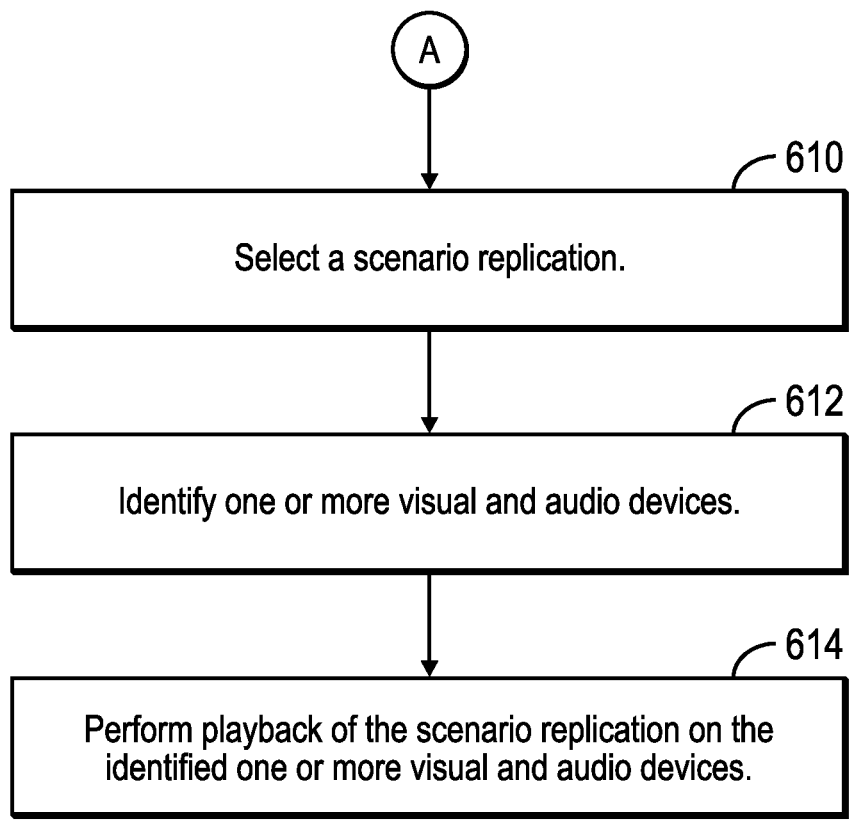

FIGS. 6A and 6B illustrate, in a flowchart, operations for creating and playing a scenario replication in accordance with certain embodiments. Control begins at block 600 with the activity engine 110 identifying a current context. In block 602, the activity engine 110 matches (i.e., maps) the current context to a context stored in the historical knowledge corpus. In block 604, the activity engine 110 retrieves one or more patterns associated with the matched context. In block 606, the activity engine 110 generates one or more recommendations from the one or more patterns, where each of the one or more recommendations identifies an activity and is associated with a goal. That is, the recommendation for the activity and the activity may be associated with the goal. In block 608, the activity engine 110 generates a scenario replication for each of the one or more recommendations. From block 608 (FIG. 6A), processing continues to block 610 (FIG. 6B).

In block 610, the activity engine 110 identifies a scenario replication. In certain embodiments, the activity engine 110 receives selection of the scenario replication from a user. In other embodiments, the activity engine automatically identifies a scenario replication. In certain embodiments, each scenario replication has an associated score based on how often that scenario replication occurred using the historical data, and the automatic selection selects the scenario replication with a highest score.

In block 612, the activity engine 110 identifies one or more visual and audio devices (e.g., a mobile computing device or a television and separate speakers).

In block 614, the activity engine 110 performs playback of the scenario replication on the identified one or more visual and audio devices.

Figure 7:
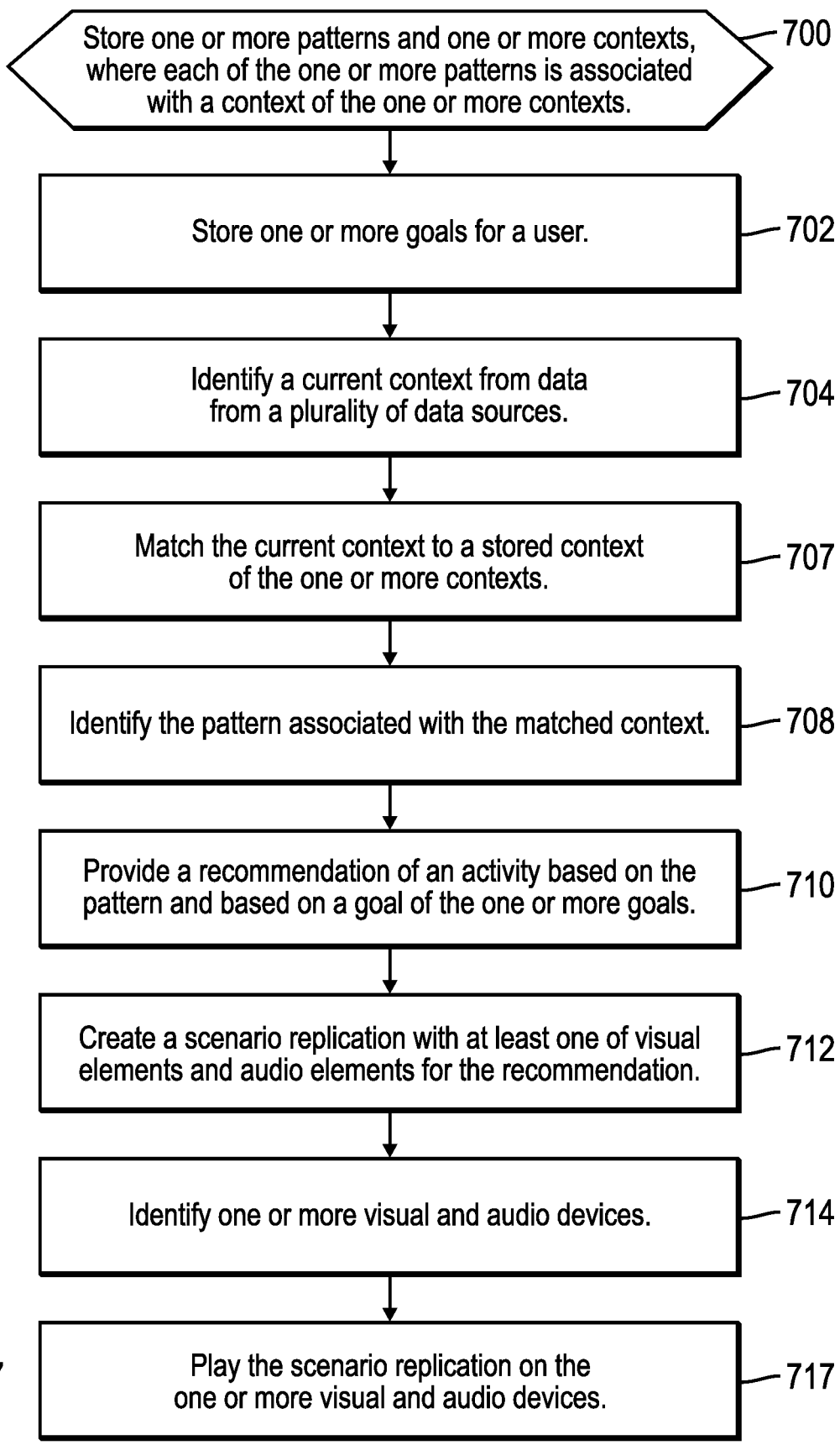
FIG. 7 illustrates, in a flowchart, operations for dynamically creating and playing a scenario replication for an activity on visual and audio devices in accordance with certain embodiments.

FIG. 7 illustrates, in a flowchart, operations for dynamically creating and playing a scenario replication for an activity on visual and audio devices in accordance with certain embodiments. Control begins at block 700 with the activity engine 110 stores one or more patterns and one or more contexts, where each of the one or more patterns is associated with a context of the one or more contexts. In block 702, the activity engine 110 stores one or more goals for a user. In block 704, the activity engine 110 identifies a current context from data from a plurality of data sources. In block 706, the activity engine 110 matches the current context to a stored context of the one or more contexts. In certain embodiments, the match is an exact match, while, in other embodiments, the match is a fuzzy (i.e., similar) match based on one or more matching characteristics.

In block 708, the activity engine 110 identifies the pattern associated with the matched context. In block 710, the activity engine 110 provides a recommendation of an activity based on the pattern and based on a goal of the one or more goals. In certain embodiments, the goal is selected by the user. In other embodiments, the activity engine 110 automatically identifies a goal based on the pattern (e.g., the pattern identifies exercise, and the activity engine 110 automatically identifies a goal regarding exercise). In block 712, the activity engine 110 creates a scenario replication with at least one of visual elements and audio elements (e.g., video elements and/or audio elements) for the recommendation. In block 714, the activity engine 110 identifies one or more visual and audio devices. In block 716, the activity engine 110 plays the scenario replication on the one or more visual and audio devices.

In certain embodiments, the activity engine 110 executes in an AI-enabled environment or with data sources (including IoT devices) capturing historical data of the users and creates a historical knowledge corpus. The users may form groups, such as family members groups, friend groups, etc.

In certain embodiments, each user or a user representing a group connects to the data sources (such as the IoT devices) and opts-in to share data (e.g., feeds and logs) with the activity engine 110.

The activity engine 110 integrates with the data sources. For example, the activity engine 110 integrates with the user calendar, media feeds, gallery, screen time, conversational history, etc. As another example, the activity engine 110 stores, for a workout, relevant heart rate, steps, pace length, time elapsed, best time, distance, temperature, ambient temperature, weather etc. As a further example, the activity engine may store user fitness training information and daily exercise details defined by the user or by a trainer.

In certain embodiments, the data from the data sources includes data about user activities (e.g., browser history, fitness history, social media presence, reading/listening content preferences, etc.). While the user performs various goal and result oriented tasks, the data sources may store data on each task and on various parameters specific to each task, and this data is accessed by the activity engine 110.

In certain embodiments, the activity engine 110 stores the user's sleep pattern or day activity schedule or any ad hoc tasks that pop-up. Also, the activity engine 110 may store the user's schedule (e.g., hours of the day that the user is active or productive versus resting). In addition, the activity engine 110 may store the user's proactiveness or change in behavior during any particular conversations or during any particular work.

In certain embodiments, the activity engine 110 stores activity feeds of a user or a group that is captured over a period of time (making this historical data). The activity engine 110 may use the activity feeds to derive the user activity relationship. Examples of the activity feeds include data from gym equipment; data from digital assets (e.g., pictures and videos); data from activity on brain games or online games (e.g., using mobile devices); data from health devices; data from reading activities (e.g., identified by downloads and bookmarks (e.g., on mobile devices)); data from hobbies (e.g., playing music). Examples of the user activity relationship include: user woke up early and exercised, user went online and bookmarked a page describing a car, user likes to play jazz music, etc.

In certain embodiments, the activity engine 110 stores user information with respect to a fitness goal. Then, the activity engine 110 may provide recommendations to the user to follow that fitness plan and may create a scenario replication for playback to cue the user to perform activities (e.g., cooking and exercise) to reach the fitness goal.

In certain embodiments, the data from the data sources from a task that the user is performing is uploaded to the activity engine 110, and the activity engine 110 measures the data against historical data and identifies a context for the data relative to the goal. Then, during subsequent repetitions of the task, the data from the data sources is similarly uploaded to the activity engine 110, and the activity engine 110 measures this data against historical data and identifies a context for the data relative to the goal. Identifying the context may be described as classification. In certain embodiments, the activity engine 110 identifies when the user does not perform a task for a preset duration or does not perform the task to a baseline of the parameters. For example, if the activity engine 110 determines that the desired progress for a fitness goal is not being met in a day, then, the activity engine 110 uses the historical data to identify a typical waiting period before providing a recommendation to the user and playing scenario replication. The waiting period refers to an amount of time that the historical data shows that the user has taken a break before resuming exercise (e.g., to answer a phone call, drink water, etc.).

With embodiments, the activity engine sends alerts to the user that include, for example, reminders of tasks, motivational messages, milestones accomplished, milestones remaining to reach goals, etc.

In certain embodiments, the activity engine 110 generates and sends scenario replications representing historical achievements (e.g., memory albums, music or other audio) along with recommendations (e.g., music recommendations) to motivate the user to resume a task (e.g., a planned physical activity) to meet a goal.

In certain embodiments, the activity engine 110 creates the scenario replication as a digital replica of user expression and experience for different outcomes for different contexts.

In certain embodiments, the activity engine 110 identifies one or more visual and audio devices that are capable of playing the scenario replication (e.g., to exhibit the expression that was created as a digital replica).

In certain embodiments, the activity engine 110 recommends the appropriate activity planning to encourage the user to keep a planned schedule to meet goals (e.g., goals towards a health journey, and, in other words, a journey along a healthy mindfulness path).

Embodiments recreate scenario replications (past moments) based on an identified knowledge graph. Embodiments provide the user with a suggestion for an activity, along with the context (i.e., the background of why the suggestion is being sent and the reasons for deviation from the normal for that activity (e.g., walking a certain number of steps a week)) to help the user. In this case, embodiments may indicate that the user is not spending time on exercise and has been sitting for work for long periods, which has resulted in low step counts in a particular week.

The activity engine 110 allows the user to tag future goals as best from the past (e.g., the most step count for a week), moderate from the past (e.g., the average step count for a week), and last week's schedule (e.g., the same step count as last week) based on goals (which may be personal goals and/or professional). Then, based on the tagging, the activity engine 110 recommends an activity and recreates a historical scenario with the scenario replication to encourage the user to perform the activity. With more tagging, the activity engine 110 continues to evolve to automatically detect an optimal schedule (e.g., which may be a best or a moderate schedule) for the user to meet one or more goals.

In certain embodiments, if there is any deviation identified from the data in the data sources 150, the activity engine 110 identifies the reasons for the deviation (e.g., a technical issue with a device or wearable, a user side issue (the user is working more hours and is walking less) etc.), and provides a recommendation to correct the deviation and provides a scenario replication for the recommendation.

The activity engine 110 identifies any deviation in an exercise program and provides recommendations to get back on track. The activity engine 110 provides a visual and audio feedback with, for example, a video of the user cooking healthy food, music that the user typically listens to while exercising, etc.

The activity engine 110, based on the data sources and the identified deviations, further drill downs by interacting with the user for every context related to the user (e.g., extracted from a knowledge graph of past events of an IoT feed) and recreates the scenario replications that helped the user previously.

In certain embodiments, based on historical learning of a user in any context, the activity engine 110 identifies the context for that user, mobility patterns of the user (e.g., the user goes to work in the morning and goes to the gym in the evening), data from IoT feeds, data from wearable feeds, and/or data from smart home device logs (e.g., home automation system activity logs). An example smart home device may log how many hours a user watches television or how many hours the user spends cooking. In certain embodiments, the activity engine 110 creates a correlation of the context and user activity in relationship with the data generated from the IoT feeds, wearable feeds, and/or smart home device logs to identify a recommendation for the user currently. In certain embodiments, the activity engine 110 receives an on-demand request to identify the recommendation.

In certain embodiments, the activity engine 110 identifies the feeds and logs of the data sources (e.g., the IoT feeds, the wearables feeds, the smart home device logs, etc.) for different contexts. The feeds and logs may describe user activities, user issued commands, etc. The activity engine 110 also identifies the mobility patterns from the feeds and logs. Then, the activity engine 110 builds a knowledge graph for a first time usage of the activity engine 110 and identifies deviations for subsequent usage. The activity engine 110 in this manner learns a user's patterns and stores these patterns for future reference.

In certain embodiments, based on the data from data sources (e.g., IoT signals from sensors, signals form wearable devices), the activity engine 110 performs analysis on the data from the data sources (e.g., by analyzing the user's interest based on the user's movements, commands issued, etc.) and identifies the deviations from the past context when compared with the current context.

In certain embodiments, based on the deviations in the mobility and direction of mobility, the activity engine 110 predicts a next activity that the user is likely to be engaged in with reference to a particular period of the day (e.g., morning versus evening) and for different temperature or climatic conditions. Based on the prediction, the activity engine 110 generates a scenario replication to cue the user to perform the predicted activity. The scenario replication re-creates a past scenario for that activity using historical data. In certain embodiments, the activity engine 110 predicts the next activity and creates the scenario replication when the deviations from the historical context for the user exceed a threshold.

In certain embodiments, the activity engine 110 derives patterns for the user from the data of the data sources and categorizes the patterns by contextual situation between the extracted relationship graphs. In certain embodiments, the knowledge graph is a super set. From the knowledge graph of user, the activity engine 110 identifies the nodes and connectors that are related to a particular relationship, and these identified nodes and connectors form a relationship graph. For example, a user performs multiple activities. In this example, waking up early and going to a gym are interconnected based on historical data. Then, the activity engine derives a pattern of: if the user wakes up early, there is a 95% chance the user will go to the gym.

In certain embodiments, the activity engine 110 automatically identifies the current context from the data of the data sources. For example, the disparate data sources may include: user inputs (e.g., voice, gesture, wearable input, etc.), a conversational dialogue with any bot or avatar (e.g., social and home automation voice assistants). The activity engine 110 compares the current context to historical contexts to identify a matching historical context. For example, a current context may indicate that the user wants to start dinner on a Tuesday evening, and the current context may match to a historical context that indicates that the user normally makes a salad and an entre on Tuesday evening. As another example, the current context may indicate that the user wants to order dinner on a Friday evening, and the current context may match to a historical context that indicates that the user normally orders a particular food on Friday evening.

In certain embodiments, the activity engine 110 creates a digital replica of the user's expressions and experiences for different outcomes and for different contexts. Then, the activity engine 110 identifies one or more visual and audio devices capable of exhibiting the digital replica, sends the digital replica to the identified one or more visual and audio devices, and initiates playback of the digital replica on the identified one or more visual and audio devices.

In certain embodiments, the activity engine 110 may be used in corporate or enterprise environments to determine, via a gamification mechanism, how a user is feeling about a work environment. Adding this to the data from the data sources (e.g., the IoT feeds, the wearable feeds, etc.) provides insights, and the activity engine 110 validates the insights with the data from the data sources (e.g., the user's response derived from gestures, conversation, movement, etc.). Then, the activity engine 110 provides recommendations to the enterprise and generates a scenario replication to recreate a past scenario based on historical preferences of the user in which the user was feeling better about the work environment (e.g., by playing music that the user likes when working, by providing a video on ergonomics, etc.).

For example, if a user's wearable feed suggests "no activity, the user response in gamification may indicate that energy levels are low, and this provides insight on the user. Then, the activity engine 110 may facilitate (cue or encourage) the user to take a break and go to the gym or participate in a different activity with a scenario replication so that the user returns with energy levels being high.

In certain embodiments, the activity engine 110 also extends the scope from individual to group situations and derives how one or more groups are responding to a situation (e.g., an enterprise situation) and suggests replicating a historical scenario. For example, if one group or one or more users from the group are showing low energy levels, then the activity engine 110 may facilitate the group take a break and go to the gym or participate in a different activity with a scenario replication so that the group returns with energy levels being high.

In certain embodiments, the activity engine 110 leverages AI with IoT opt-in sensors to develop a knowledge graph and extract relevant contextual scenarios to be showcased on video and audio devices to increase user activities.

Figure 8:
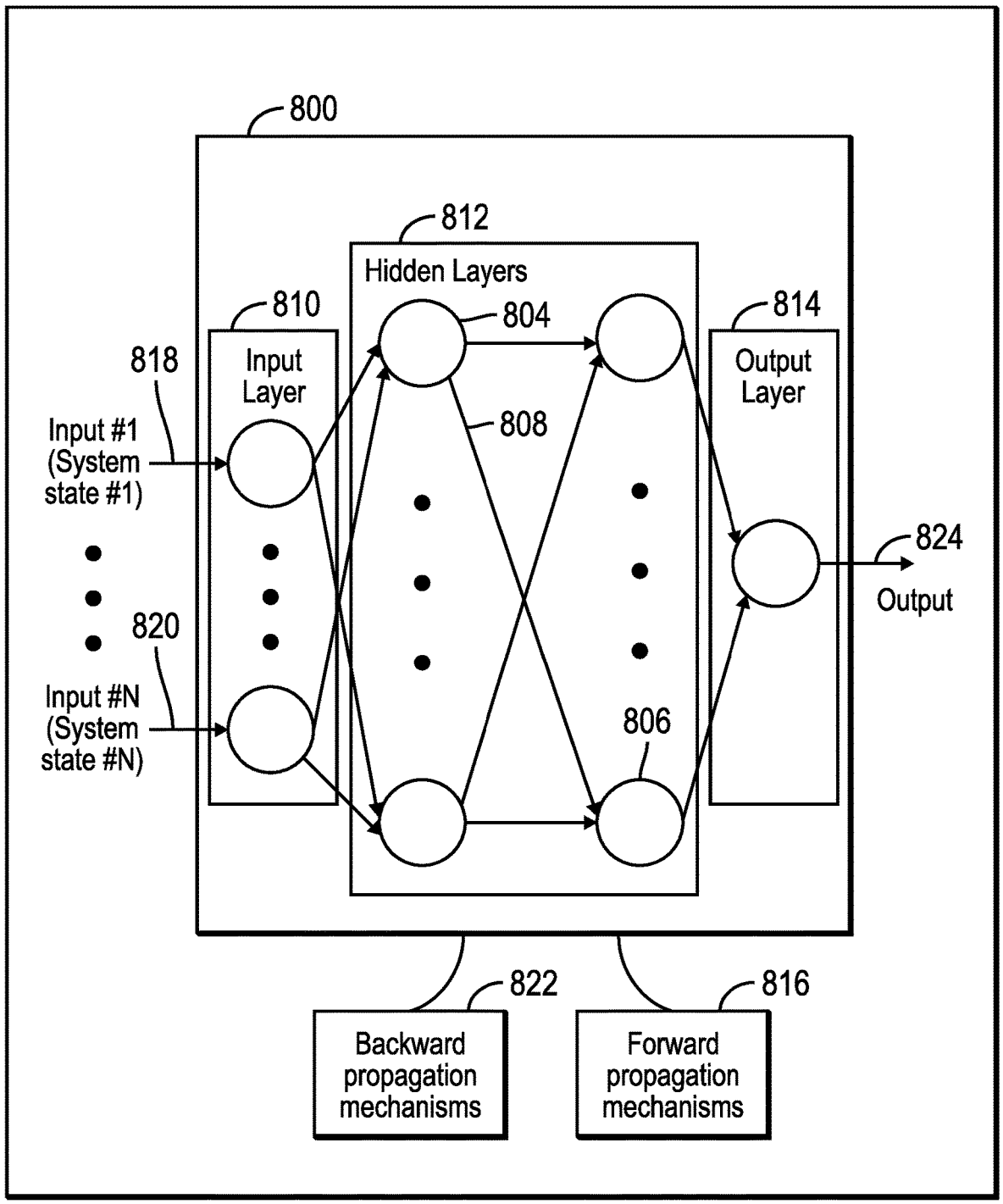
FIG. 8 illustrates, in a block diagram, details of a machine learning model in accordance with certain embodiments.

FIG. 8 illustrates, in a block diagram, details of a machine learning model 800 in accordance with certain embodiments. In certain embodiments, the one or more machine learning modules 170 are implemented using the components of the machine learning model 800.

The machine learning model 800 may comprise a neural network with a collection of nodes with links connecting them, where the links are referred to as connections. For example, FIG. 8 shows a node 804 connected by a connection 808 to the node 806. The collection of nodes may be organized into three main parts: an input layer 810, one or more hidden layers 812, and an output layer 814.

The connection between one node and another is represented by a number called a weight, where the weight may be either positive (if one node excites another) or negative (if one node suppresses or inhibits another). Training the machine learning model 800 entails calibrating the weights in the machine learning model 800 via mechanisms referred to as forward propagation 816 and backward propagation 822. Bias nodes that are not connected to any previous layer may also be maintained in the machine learning model 800. A bias may be described as an extra input of 1 with a weight attached to it for a node.

In forward propagation 816, a set of weights are applied to the input data 818 . . . 820 to calculate the output 824. For the first forward propagation, the set of weights may be selected randomly or set by, for example, a system administrator. That is, in the forward propagation 816, embodiments apply a set of weights to the input data 818 . . . 820 and calculate an output 824.

In backward propagation 822 a measurement is made for a margin of error of the output 824, and the weights are adjusted to decrease the error. Backward propagation 822 compares the output that the machine learning model 800 produces with the output that the machine learning model 800 was meant to produce, and uses the difference between them to modify the weights of the connections between the nodes of the machine learning model 800, starting from the output layer 814 through the hidden layers 812 to the input layer 810, i.e., going backward in the machine learning model 800. In time, backward propagation 822 causes the machine learning model 800 to learn, reducing the difference between actual and intended output to the point where the two come very close or coincide.

The machine learning model 800 may be trained using backward propagation to adjust weights at nodes in a hidden layer to produce adjusted output values based on the provided inputs 818 . . . 820. A margin of error may be determined with respect to the actual output 824 from the machine learning model 800 and an expected output to train the machine learning model 800 to produce the desired output value based on a calculated expected output. In backward propagation, the margin of error of the output may be measured and the weights at nodes in the hidden layers 812 may be adjusted accordingly to decrease the error.

Backward propagation may comprise a technique for supervised learning of artificial neural networks using gradient descent. Given an artificial neural network and an error function, the technique may calculate the gradient of the error function with respect to the artificial neural network's weights.

Thus, the machine learning model 800 is configured to repeat both forward and backward propagation until the weights of the machine learning model 800 are calibrated to accurately predict an output.

The machine learning model 800 implements a machine learning technique such as decision tree learning, association rule learning, artificial neural network, inductive programming logic, support vector machines, Bayesian models, etc., to determine the output value 824.

In certain machine learning model 800 implementations, weights in a hidden layer of nodes may be assigned to these inputs to indicate their predictive quality in relation to other of the inputs based on training to reach the output value 824.

With embodiments, the machine learning model 800 is a neural network, which may be described as a collection of "neurons" with "synapses" connecting them.

With embodiments, there may be multiple hidden layers 812, with the term "deep" learning implying multiple hidden layers. Hidden layers 812 may be useful when the neural network has to make sense of something complicated, contextual, or non-obvious, such as image recognition. The term "deep" learning comes from having many hidden layers. These layers are known as "hidden", since they are not visible as a network output.

In certain embodiments, training a neural network may be described as calibrating all of the "weights" by repeating the forward propagation 816 and the backward propagation 822.

In backward propagation 822, embodiments measure the margin of error of the output and adjust the weights accordingly to decrease the error.

Neural networks repeat both forward and backward propagation until the weights are calibrated to accurately predict the output 824.

In certain embodiments, the inputs to the machine learning model 800 are the data from the data sources, and the outputs of the machine learning model 800 are at least one recommendation and at least one scenario replication. In certain embodiments, the machine learning model may be refined based on whether the outputted recommendations, once taken, generate positive outcomes.

Figure 9:
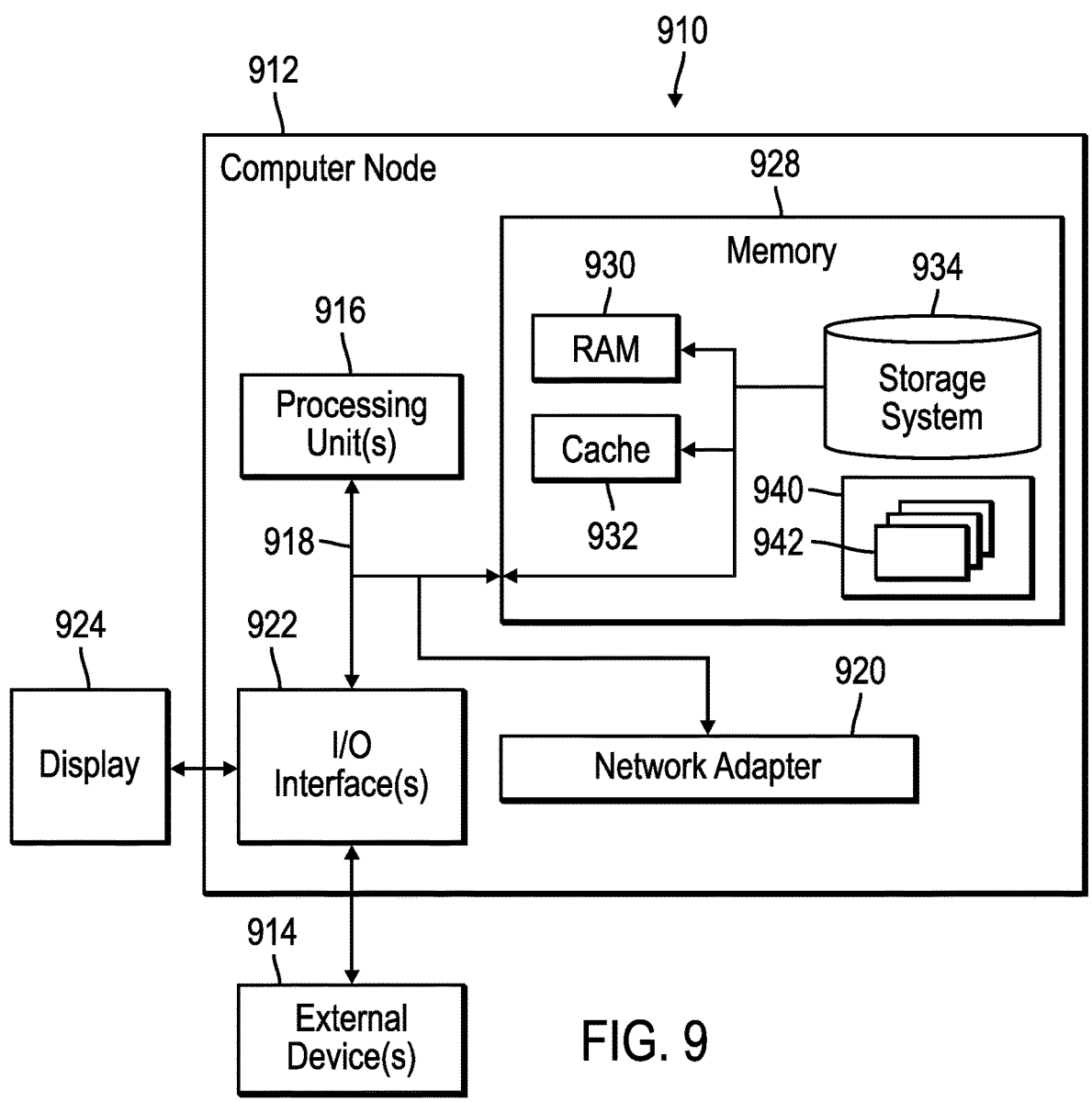
FIG. 9 illustrates a computing node in accordance with certain embodiments.

FIG. 9 illustrates a computing environment 910 in accordance with certain embodiments. In certain embodiments, the computing environment is a cloud computing environment. Referring to FIG. 9, computer node 912 is only one example of a suitable computing node and is not intended to suggest any limitation as to the scope of use or functionality of embodiments of the invention described herein. Regardless, computer node 912 is capable of being implemented and/or performing any of the functionality set forth hereinabove.

The computer node 912 may be a computer system, which is operational with numerous other general purpose or special purpose computing system environments or configurations. Examples of well-known computing systems, environments, and/or configurations that may be suitable for use with computer node 912 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 912 may be described in the general context of computer system executable instructions, such as program modules, being executed by a computer system. Generally, program modules may include routines, programs, objects, components, logic, data structures, and so on that perform particular tasks or implement particular abstract data types. Computer node 912 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer node 912 is shown in the form of a general-purpose computing device. The components of computer node 912 may include, but are not limited to, one or more processors or processing units 916, a system memory 928, and a bus 918 that couples various system components including system memory 928 to one or more processors or processing units 916.

Bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 912 typically includes a variety of computer system readable media. Such media may be any available media that is accessible by computer node 912, and it includes both volatile and non-volatile media, removable and non-removable media.

System memory 928 can include computer system readable media in the form of volatile memory, such as random access memory (RAM) 930 and/or cache memory 932. Computer node 912 may further include other removable/non-removable, volatile/non-volatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a compact disc read-only memory (CD-ROM), digital versatile disk read-only memory (DVD-ROM) or other optical media can be provided. In such instances, each can be connected to bus 918 by one or more data media interfaces. As will be further depicted and described below, system memory 928 may include at least one program product having a set (e.g., at least one) of program modules that are configured to carry out the functions of embodiments of the invention.

Program/utility 940, having a set (at least one) of program modules 942, may be stored in system memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the invention as described herein.

Computer node 912 may also communicate with one or more external devices 914 such as a keyboard, a pointing device, a display 924, etc.; one or more devices that enable a user to interact with computer node 912; and/or any devices (e.g., network card, modem, etc.) that enable computer node 912 to communicate with one or more other computing devices. Such communication can occur via Input/Output (I/O) interfaces 922. Still yet, computer node 912 can communicate with one or more networks such as a local area network (LAN), a general wide area network (WAN), and/or a public network (e.g., the Internet) via network adapter 920. As depicted, network adapter 920 communicates with the other components of computer node 912 via bus 918. It should be understood that although not shown, other hardware and/or software components could be used in conjunction with computer node 912. Examples, include, but are not limited to: microcode, device drivers, redundant processing units, external disk drive arrays, Redundant Array of Inexpensive Disks (RAID) systems, tape drives, and data archival storage systems, etc.

In certain embodiments, the computing device 100 has the architecture of computer node 912. In certain embodiments, the computing device 100 is part of a cloud infrastructure. In certain alternative embodiments, the computing device 100 is not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
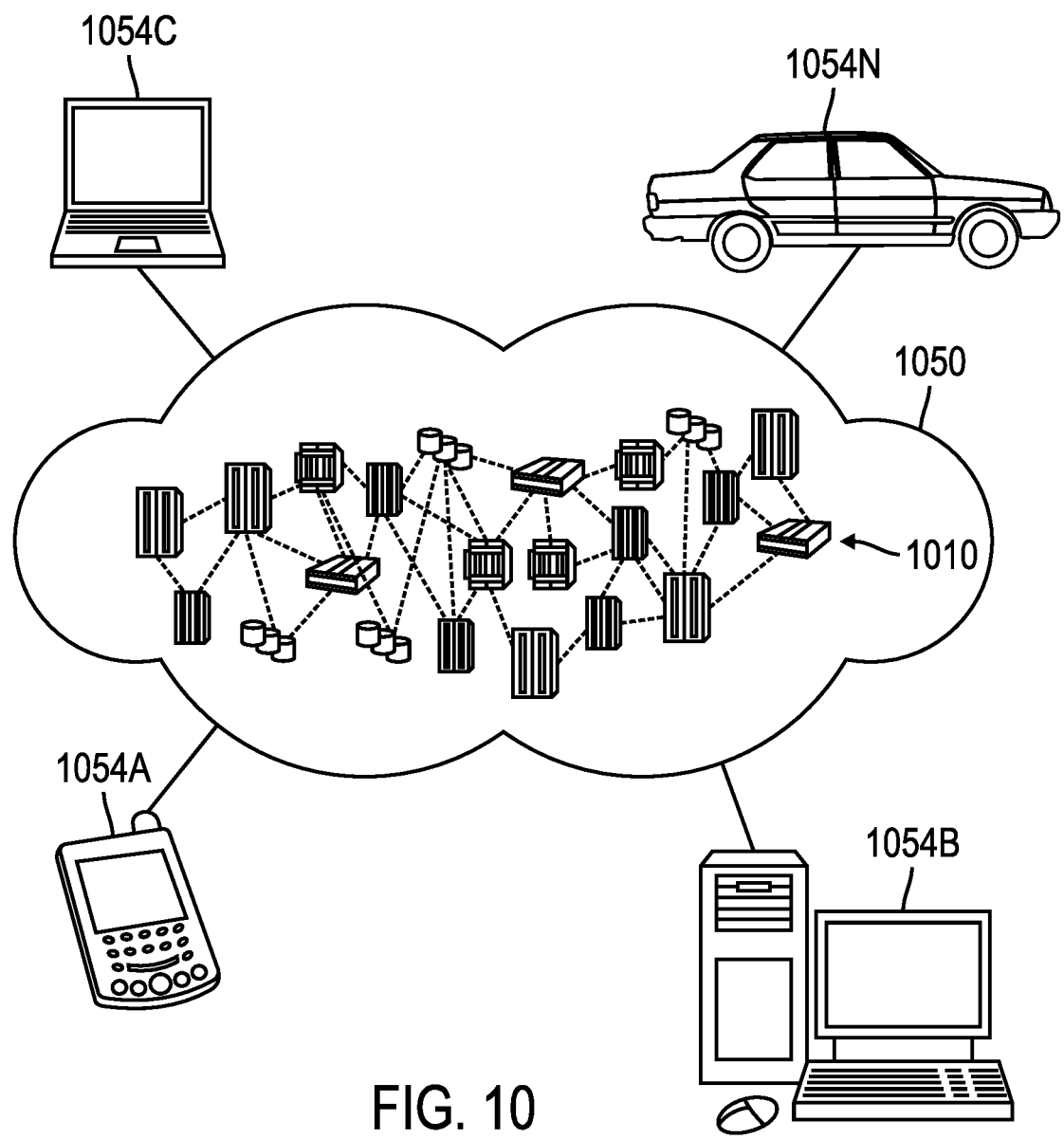
FIG. 10 illustrates a cloud computing environment in accordance with certain embodiments.

Referring now to FIG. 10, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
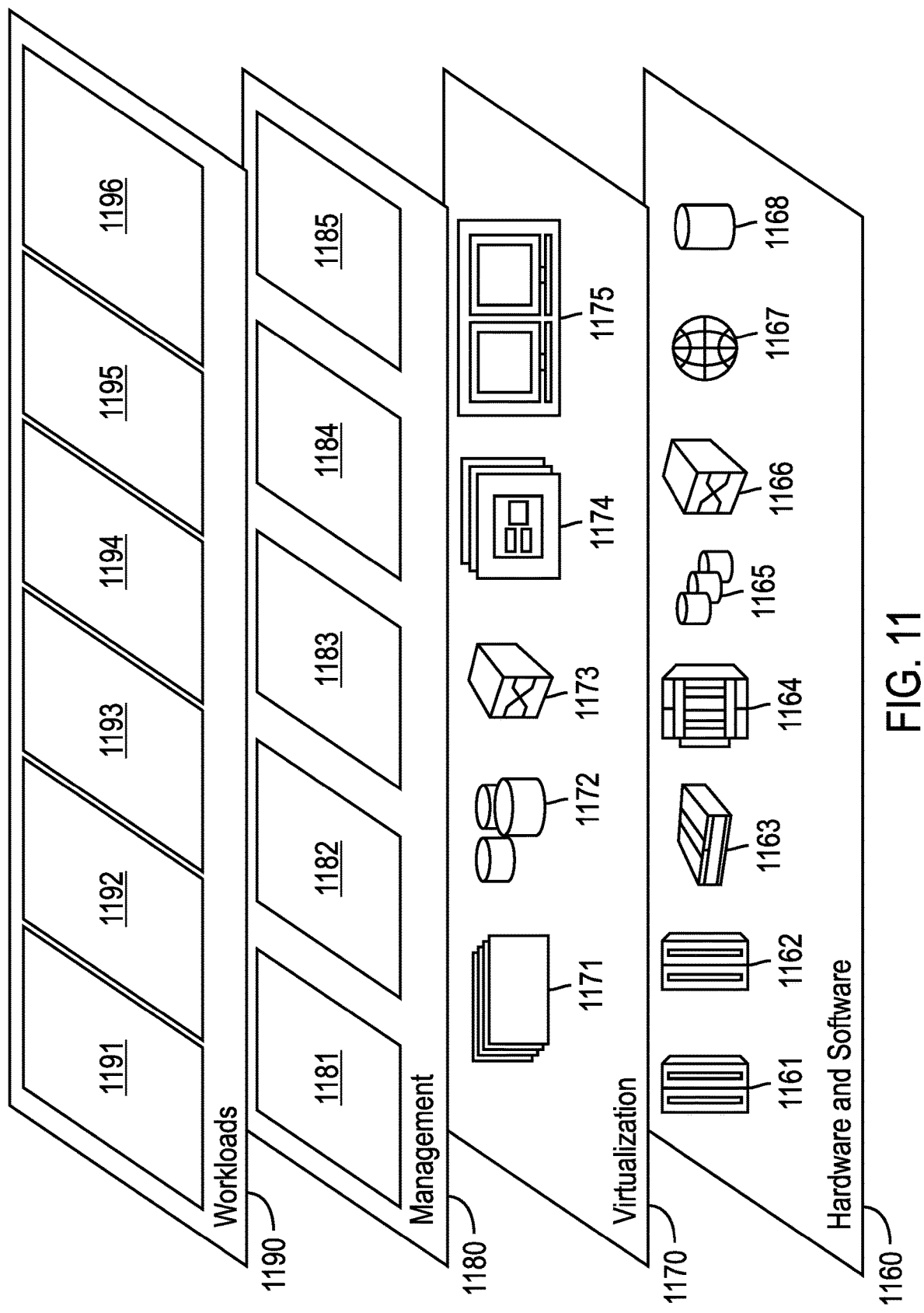
FIG. 11 illustrates abstraction model layers in accordance with certain embodiments.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and dynamically creating and playing a scenario replication for an activity on visual and audio devices 1196.

Thus, in certain embodiments, software or a program, implementing dynamically creating and playing a scenario replication for an activity on visual and audio devices in accordance with embodiments described herein, is provided as a service in a cloud environment.

Additional Embodiment Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

In the described embodiment, variables a, b, c, i, n, m, p, r, etc., when used with different elements may denote a same or different instance of that element.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer-implemented method, comprising operations for:
   storing one or more patterns for activities of a user and one or more contexts, wherein each of the one or more patterns is associated with a context of the one or more contexts;
   storing one or more goals for the user;
   identifying a current context from data from a plurality of data sources;
   matching the current context to a stored context of the one or more contexts;
   identifying the pattern associated with the matched, stored context;
   providing a recommendation of an activity based on the identified pattern and based on a goal of the one or more goals;
   generating a plurality of scenario replications for the recommendation, wherein each scenario replication of the plurality of scenario replications is associated with a score, and wherein each scenario replication comprises at least one of visual elements and audio elements;
   selecting a scenario replication from the plurality of scenario replications having a highest score;
   identifying one or more visual and audio devices; and
   playing the selected scenario replication on the one or more visual and audio devices.

2. The computer-implemented method of claim 1, wherein the plurality of data sources comprise connected devices, social media feeds, and user connected feeds.

3. The computer-implemented method of claim 1, further comprising operations for:
   generating a knowledge graph using the data from the plurality of data sources.

4. The computer-implemented method of claim 1, further comprising operations for:
   receiving new data from a conversation between the user and another user;
   storing the new data in a historical knowledge corpus with previously stored data;
   selecting a subset of the data in the historical knowledge corpus pertaining to the user and the another user;
   providing a new recommendation based on the selected subset of the data and a new context of the conversation between the user and the another user; and
   creating a new scenario replication with at least one of the visual elements and the audio elements for the new recommendation.

5. The computer-implemented method of claim 1, wherein the associated score is based on how often that scenario replication occurred using historical data in a historical knowledge corpus.

6. The computer-implemented method of claim 1, further comprising operations for:
   determining a deviation from the identified pattern based on the data in a historical knowledge corpus.

7. The computer-implemented method of claim 1, wherein a Software as a Service (SaaS) is configured to perform the operations of the computer-implemented method.

8. A computer program product, the computer program product comprising a computer readable storage medium having program code embodied therewith, the program code executable by at least one processor to perform operations for:
   storing one or more patterns for activities of a user and one or more contexts, wherein each of the one or more patterns is associated with a context of the one or more contexts;
   storing one or more goals for the user;
   identifying a current context from data from a plurality of data sources;
   matching the current context to a stored context of the one or more contexts;
   identifying the pattern associated with the matched, stored context;
   providing a recommendation of an activity based on the identified pattern and based on a goal of the one or more goals;
   generating a plurality of scenario replications for the recommendation, wherein each scenario replication of the plurality of scenario replications is associated with a score, and wherein each scenario replication comprises at least one of visual elements and audio elements;
   selecting a scenario replication from the plurality of scenario replications having a highest score;
   identifying one or more visual and audio devices; and
   playing the selected scenario replication on the one or more visual and audio devices.

9. The computer program product of claim 8, wherein the plurality of data sources comprise connected devices, social media feeds, and user connected feeds.

10. The computer program product of claim 8, wherein the program code is executable by the at least one processor to perform operations for:
    generating a knowledge graph using the data from the plurality of data sources.

11. The computer program product of claim 8, wherein the program code is executable by the at least one processor to perform operations for:
    receiving new data from a conversation between the user and another user;
    storing the new data in a historical knowledge corpus with previously stored data;
    selecting a subset of the data in the historical knowledge corpus pertaining to the user and the another user;
    providing a new recommendation based on the selected subset of the data and a new context of the conversation between the user and the another user; and
    creating a new scenario replication with at least one of the visual elements and the audio elements for the new recommendation.

12. The computer program product of claim 8, wherein the associated score is based on how often that scenario replication occurred using historical data in a historical knowledge corpus.

13. The computer program product of claim 8, wherein the program code is executable by the at least one processor to perform operations for:
    determining a deviation from the identified pattern based on the data in a historical knowledge corpus.

14. The computer program product of claim 8, wherein a Software as a Service (SaaS) is configured to perform the operations of the computer program product.

15. A computer system, comprising:
    one or more processors, one or more computer-readable memories and one or more computer-readable, tangible storage devices; and program instructions, stored on at least one of the one or more computer-readable, tangible storage devices for execution by at least one of the one or more processors via at least one of the one or more computer-readable memories, to perform operations comprising:

storing one or more patterns for activities of a user and one or more contexts, wherein each of the one or more patterns is associated with a context of the one or more contexts;

storing one or more goals for the user;

identifying a current context from data from a plurality of data sources;

matching the current context to a stored context of the one or more contexts;

identifying the pattern associated with the matched, stored context;

providing a recommendation of an activity based on the identified pattern and based on a goal of the one or more goals;

generating a plurality of scenario replications for the recommendation, wherein each scenario replication of the plurality of scenario replications is associated with a score, and wherein each scenario replication comprises at least one of visual elements and audio elements;

selecting a scenario replication from the plurality of scenario replications having a highest score;

identifying one or more visual and audio devices; and playing the selected scenario replication on the one or more visual and audio devices.

16. The computer system of claim 15, wherein the plurality of data sources comprise connected devices, social media feeds, and user connected feeds.

17. The computer system of claim 15, wherein the operations further comprise:

generating a knowledge graph using the data from the plurality of data sources.

18. The computer system of claim 15, wherein the operations further comprise:

receiving new data from a conversation between the user and another user;

storing the new data in a historical knowledge corpus with previously stored data;

selecting a subset of the data in the historical knowledge corpus pertaining to the user and the another user;

providing a new recommendation based on the selected subset of the data and a new context of the conversation between the user and the another user; and creating a new scenario replication with at least one of the visual elements and the audio elements for the new recommendation.

19. The computer system of claim 15, wherein the associated score is based on how often that scenario replication occurred using historical data in a historical knowledge corpus.

20. The computer system of claim 15, wherein a Software as a Service (SaaS) is configured to perform the operations of the computer system.

* * * * *